United States Patent
Watanabe et al.

(10) Patent No.: US 12,526,382 B2
(45) Date of Patent: Jan. 13, 2026

(54) COMMUNICATION APPARATUS, METHOD OF CONTROLLING COMMUNICATION APPARATUS, AND STORAGE MEDIUM

(71) Applicant: CANON KABUSHIKI KAISHA, Tokyo (JP)

(72) Inventors: Kenta Watanabe, Kanagawa (JP); Sosuke Kagaya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/930,391

(22) Filed: Oct. 29, 2024

(65) Prior Publication Data
US 2025/0159103 A1 May 15, 2025

(30) Foreign Application Priority Data
Nov. 10, 2023 (JP) .................. 2023-192353

(51) Int. Cl.
*H04N 5/91* (2006.01)
*H04N 5/77* (2006.01)

(52) U.S. Cl.
CPC ............. *H04N 5/91* (2013.01); *H04N 5/77* (2013.01)

(58) Field of Classification Search
CPC .................. H04N 5/77; H04N 5/91
See application file for complete search history.

(56) References Cited

U.S. PATENT DOCUMENTS

| | | | |
|---|---|---|---|
| 5,623,377 A * | 4/1997 | Behrens | G11B 5/09 |
| 7,719,540 B2 * | 5/2010 | Piazza | G06T 15/005 |
| | | | 345/557 |
| 7,822,119 B2 * | 10/2010 | Boon | H04N 19/593 |
| | | | 375/240.12 |
| 7,830,959 B2 * | 11/2010 | Park | H04N 19/423 |
| | | | 375/240.12 |
| 8,525,902 B2 * | 9/2013 | Oikawa | H04N 5/907 |
| | | | 386/326 |
| 10,298,831 B2 * | 5/2019 | Shimosato | H04N 23/80 |
| 2003/0123557 A1 * | 7/2003 | De With | H04N 19/60 |
| | | | 375/E7.242 |
| 2003/0159139 A1 * | 8/2003 | Candelore | H04N 21/4347 |
| | | | 380/201 |
| 2004/0003178 A1 * | 1/2004 | Magoshi | G06F 12/0875 |
| | | | 711/217 |
| 2004/0010614 A1 * | 1/2004 | Mukherjee | H04N 21/2662 |
| | | | 348/E7.063 |

(Continued)

FOREIGN PATENT DOCUMENTS

JP          2022096304 A      6/2022

*Primary Examiner* — Michael B. Pierorazio
(74) *Attorney, Agent, or Firm* — Cowan, Liebowitz & Latman, P.C.

(57) ABSTRACT

A communication apparatus communicates with an external apparatus and performs, when divided files generated sequentially by dividing continuous time-series data have been generated in a first external apparatus, control to obtain the divided files from the first external apparatus. The apparatus transfers, when the divided files are obtained, the divided files to a second external apparatus. When a first divided file has been generated in the first external apparatus and the first divided file is not a specific divided file, the apparatus obtains the divided files from the specific divided file to the first divided file.

11 Claims, 11 Drawing Sheets

(56) References Cited

U.S. PATENT DOCUMENTS

| | | | | |
|---|---|---|---|---|
| 2004/0022543 A1* | 2/2004 | Hosking | ............ | H04B 10/0799 |
| | | | | 398/135 |
| 2005/0219253 A1* | 10/2005 | Piazza | ................. | G06T 15/005 |
| | | | | 345/557 |
| 2007/0101370 A1* | 5/2007 | Calderwood | .... | H04N 21/47214 |
| | | | | 725/38 |
| 2008/0031329 A1* | 2/2008 | Iwata | ................. | H04N 19/593 |
| | | | | 375/E7.176 |
| 2008/0094419 A1* | 4/2008 | Leigh | ................. | G09G 3/007 |
| | | | | 382/300 |
| 2008/0123750 A1* | 5/2008 | Bronstein | ............ | H04N 19/436 |
| | | | | 375/240.24 |
| 2009/0094658 A1* | 4/2009 | Kobayashi | ......... | H04N 21/4325 |
| | | | | 725/118 |
| 2009/0100459 A1* | 4/2009 | Riedl | ................. | H04N 21/2405 |
| | | | | 725/35 |
| 2010/0091836 A1* | 4/2010 | Jia | ................. | H04N 19/86 |
| | | | | 375/240.01 |
| 2010/0091880 A1* | 4/2010 | Jia | ................. | H04N 19/44 |
| | | | | 375/240.25 |
| 2010/0097250 A1* | 4/2010 | Demircin | ............... | H04N 19/61 |
| | | | | 341/107 |
| 2010/0098155 A1* | 4/2010 | Demircin | ............ | H03M 7/4006 |
| | | | | 375/E7.126 |
| 2010/0118945 A1* | 5/2010 | Wada | ................. | H04N 19/70 |
| | | | | 375/E7.246 |
| 2010/0128797 A1* | 5/2010 | Dey | ................. | H04N 19/61 |
| | | | | 375/240.24 |
| 2010/0195922 A1* | 8/2010 | Amano | ............... | H04N 19/176 |
| | | | | 382/233 |
| 2010/0246683 A1* | 9/2010 | Webb | ................. | H04N 19/895 |
| | | | | 375/E7.123 |
| 2010/0260263 A1* | 10/2010 | Kotaka | ............... | H04N 19/154 |
| | | | | 375/E7.243 |
| 2010/0296744 A1* | 11/2010 | Boon | ................. | H04N 19/593 |
| | | | | 382/233 |
| 2010/0321428 A1* | 12/2010 | Saito | ................. | G06K 15/102 |
| | | | | 347/9 |
| 2011/0102683 A1* | 5/2011 | Josephs | ................ | H04N 21/462 |
| | | | | 725/39 |
| 2011/0134024 A1* | 6/2011 | Park | .................... | H04N 21/4363 |
| | | | | 345/156 |
| 2011/0182523 A1* | 7/2011 | Kim | ..................... | H04N 19/593 |
| | | | | 382/233 |
| 2011/0299836 A1* | 12/2011 | Amsterdam | ....... | H04N 21/4335 |
| | | | | 386/296 |
| 2011/0304773 A1* | 12/2011 | Okumura | ............. | G09G 3/2092 |
| | | | | 348/607 |
| 2012/0007992 A1* | 1/2012 | Zhou | ................. | H04N 19/119 |
| | | | | 348/E3.051 |
| 2013/0208808 A1* | 8/2013 | Sasai | ..................... | H04N 19/117 |
| | | | | 375/240.25 |
| 2014/0119675 A1* | 5/2014 | Kim | ......................... | G06T 3/40 |
| | | | | 382/299 |
| 2014/0125832 A1* | 5/2014 | Tanji | ..................... | H04N 5/126 |
| | | | | 348/222.1 |
| 2014/0285483 A1* | 9/2014 | Yamanaka | ............. | G09G 5/393 |
| | | | | 345/419 |
| 2015/0003525 A1* | 1/2015 | Sasai | ..................... | H04N 19/117 |
| | | | | 375/240.12 |
| 2015/0124888 A1* | 5/2015 | Hwang | ............. | H04N 21/6336 |
| | | | | 375/240.26 |
| 2015/0135247 A1* | 5/2015 | Kitazato | ............ | H04N 21/4305 |
| | | | | 725/110 |
| 2015/0156557 A1* | 6/2015 | Kang | ............. | H04N 21/26258 |
| | | | | 725/131 |
| 2015/0172531 A1* | 6/2015 | Ikeda | ..................... | H04N 23/70 |
| | | | | 348/207.11 |
| 2015/0201178 A1* | 7/2015 | Lakshminarayanan | ...................... | H04N 19/187 |
| | | | | 348/43 |
| 2015/0213776 A1* | 7/2015 | Sharma | .................. | G09G 5/005 |
| | | | | 345/520 |
| 2015/0326923 A1* | 11/2015 | Chung | .................. | H04N 21/81 |
| | | | | 725/110 |
| 2016/0248958 A1* | 8/2016 | Yokomizo | ............. | H04N 5/265 |
| 2017/0353922 A1* | 12/2017 | Shirakawa | ......... | H04W 68/005 |
| 2024/0406331 A1* | 12/2024 | Fujioka | ............. | H04N 1/32117 |

\* cited by examiner

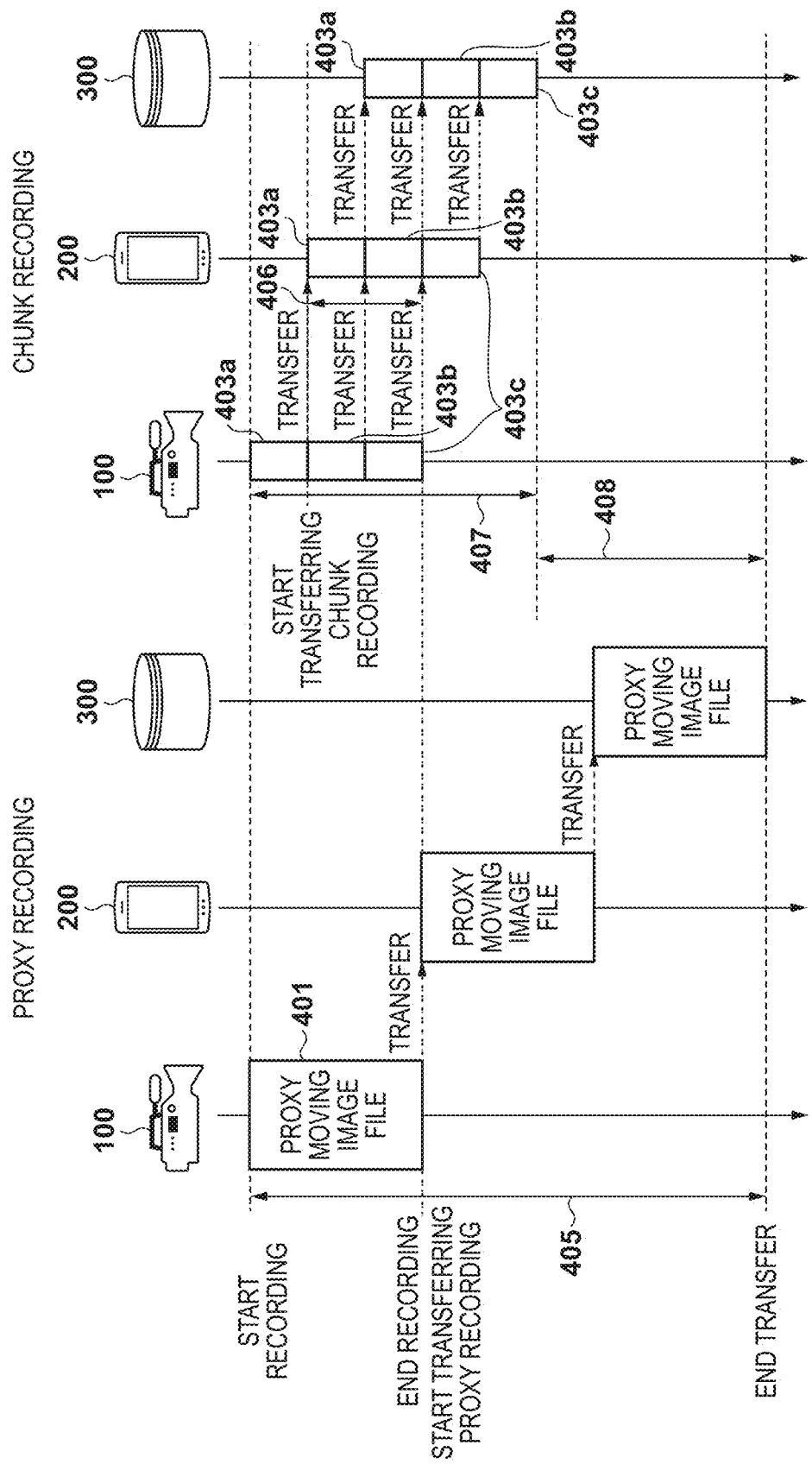

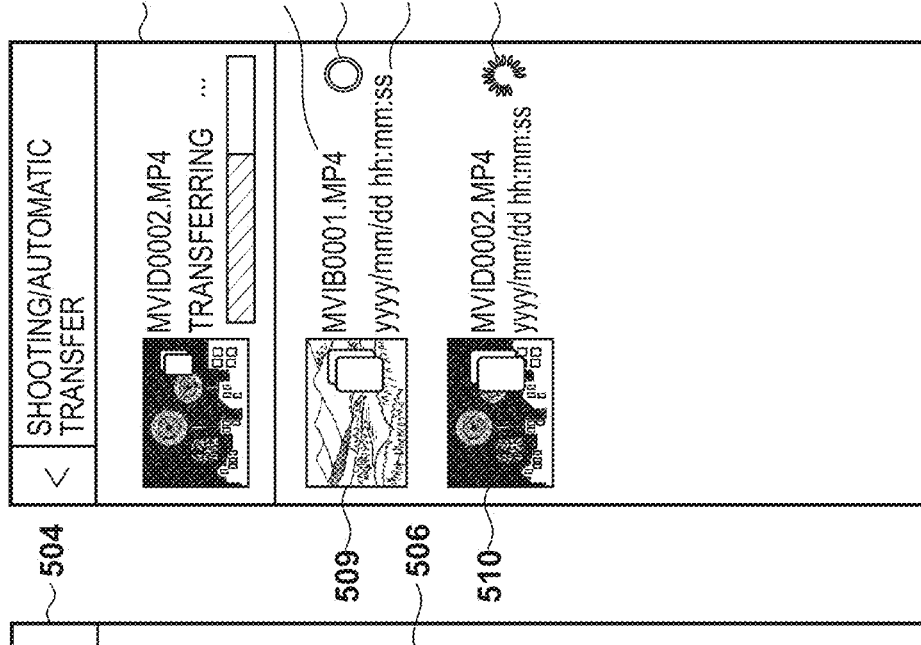
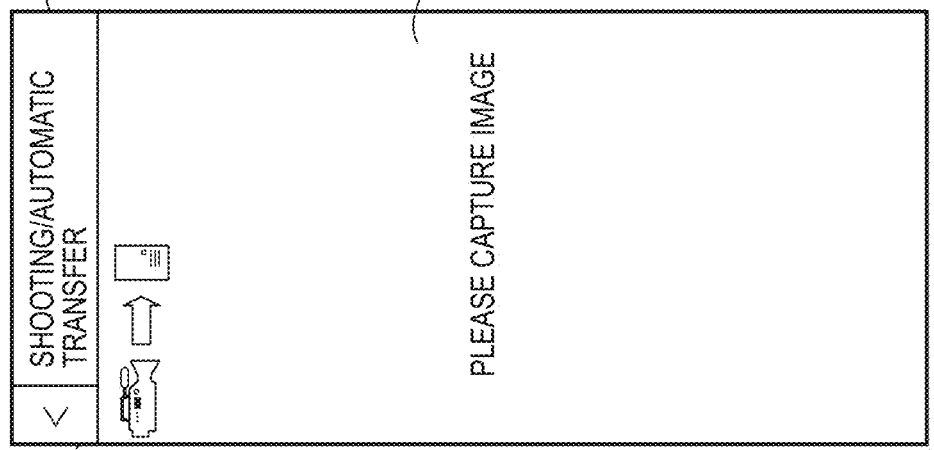
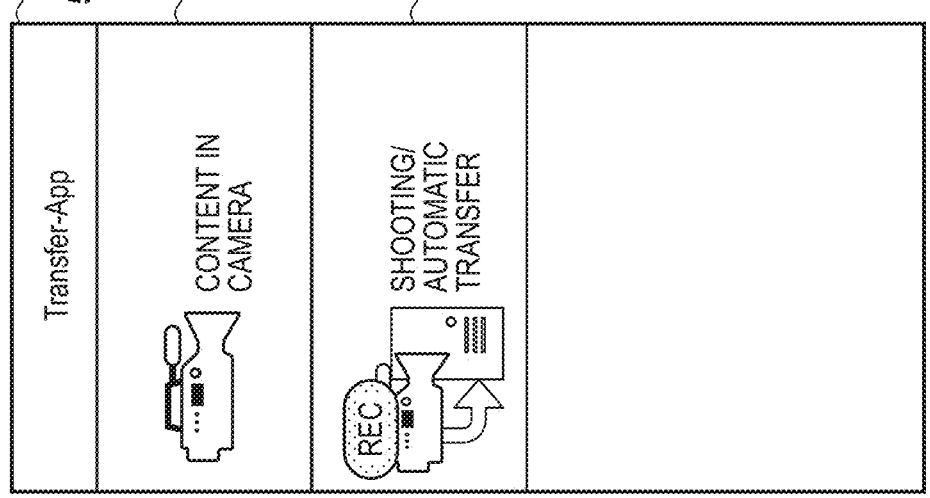

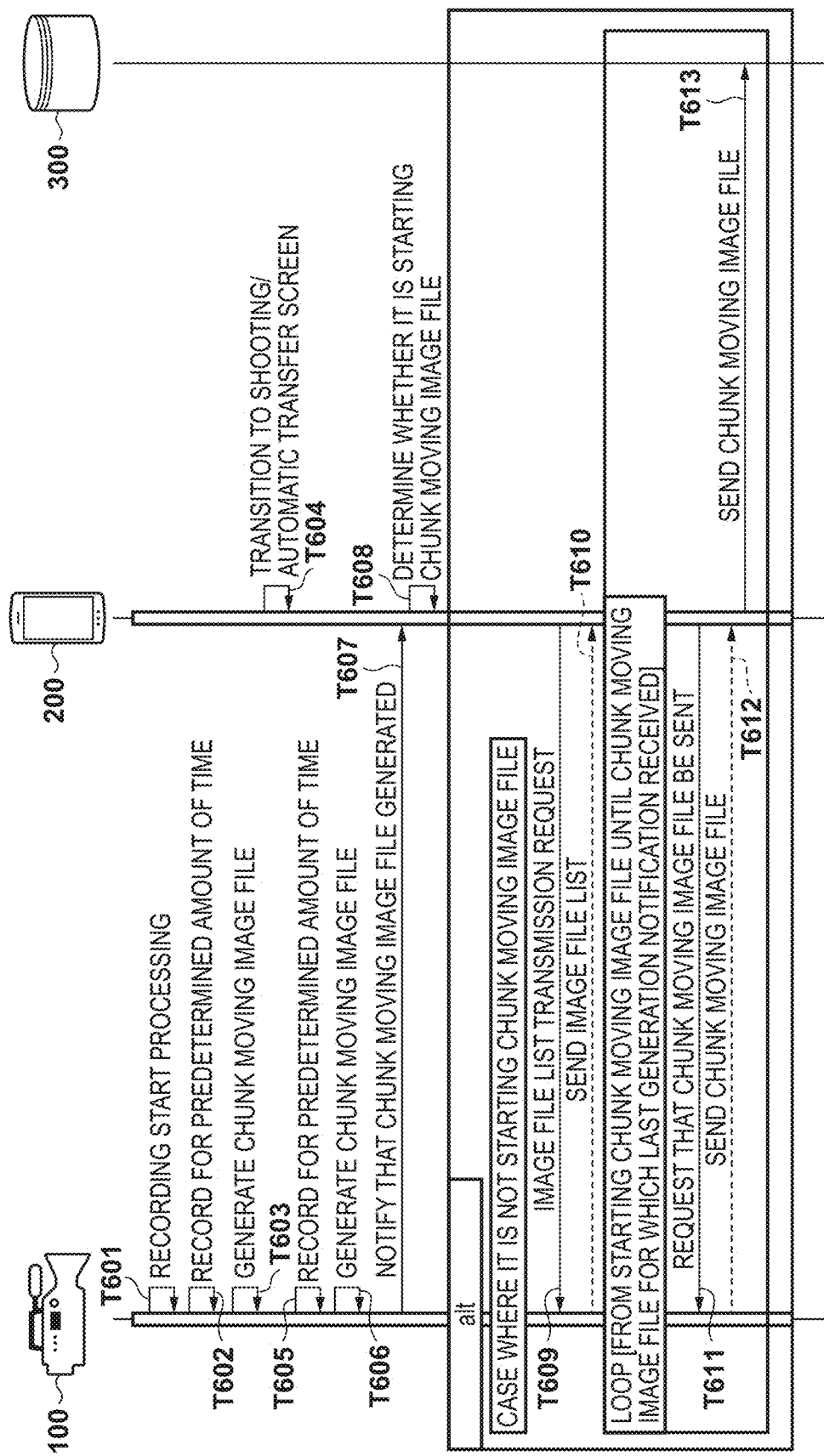

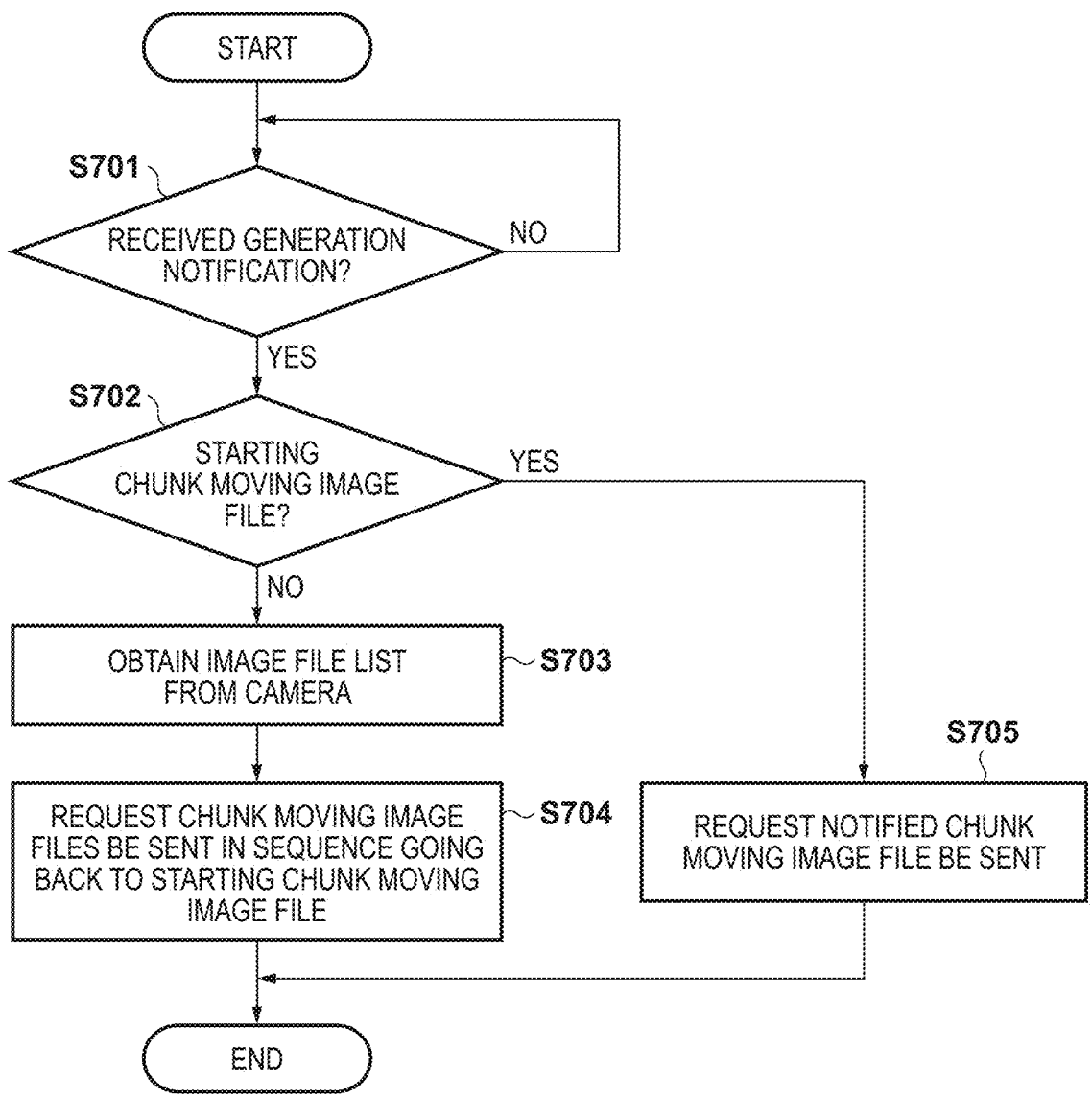

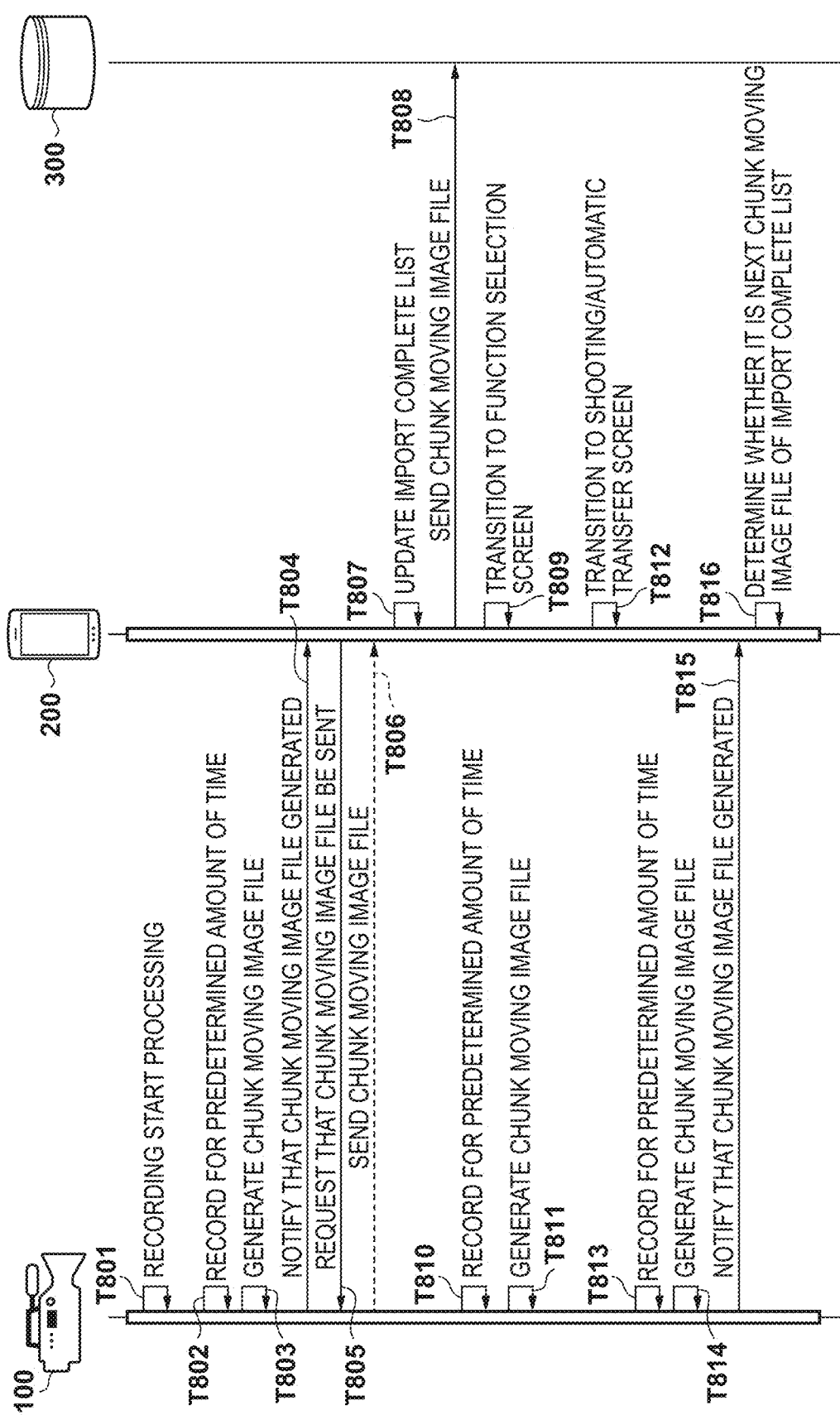

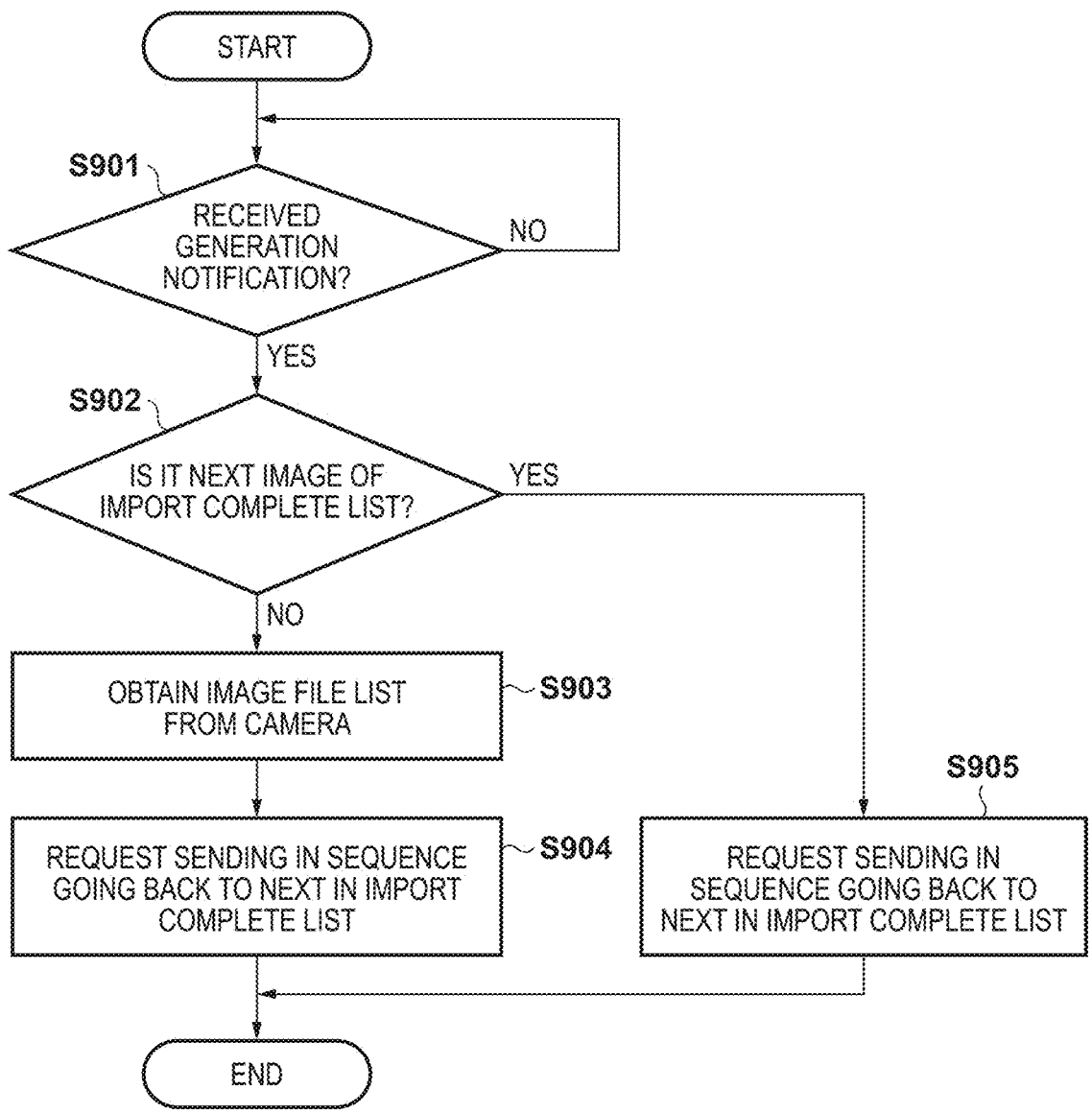

COMMUNICATION APPARATUS, METHOD OF CONTROLLING COMMUNICATION APPARATUS, AND STORAGE MEDIUM

BACKGROUND OF THE INVENTION

Field of the Invention

The present invention relates to a communication apparatus, a method of controlling a communication apparatus, and a storage medium.

Description of the Related Art

A technique is known in which an image capturing apparatus such as a digital video camera is provided with a wireless communication function, and sends, to an external apparatus, a moving image file recorded having divided a moving image captured by the image capturing apparatus at predetermined times (also called "chunk recording", hereinafter) (Japanese Patent Laid-Open No. 2022-96304). By using the technique disclosed in Japanese Patent Laid-Open No. 2022-96304, the image capturing apparatus can send the moving image to the external apparatus efficiently.

Moving image files generated through chunk recording (also called "chunk moving image files", hereinafter) can be handled as a single moving image by combining the files in the destination external apparatus. As such, it is necessary for the destination external apparatus to collect a group including a series of files, from the starting chunk moving image file to the ending chunk moving image file, and the files cannot be combined correctly in the external apparatus if some of the chunk moving image files are missing.

Incidentally, systems are known in which, when shooting images on site in the mass media industry, moving image, audio, and other such files shot and recorded by an image capturing apparatus (time-series data) are sent to a communication apparatus such as a smartphone and stored in that apparatus, and the files are further sent from the communication apparatus to a server over a network. In such a system, to ensure that chunk moving image files generated by the image capturing apparatus can be transferred, without any files missing, and combined in the server, it is necessary for the communication apparatus to appropriately control the transfer of the chunk moving image files. However, Japanese Patent Laid-Open No. 2022-96304, mentioned above, does not take into consideration the transfer of chunk moving image files through a communication apparatus.

SUMMARY OF THE INVENTION

Having been achieved in light of the stated issue, the present invention provides a technique which, when transferring time-series data such as moving image files to an external apparatus, makes it possible to prevent situations where files necessary for combining are missing.

In order to solve the aforementioned issues, one aspect of the present disclosure provides a communication apparatus comprising: a communication unit configured to communicate with an external apparatus; a control unit configured to perform, when divided files generated sequentially by dividing continuous time-series data have been generated in a first external apparatus, control to obtain the divided files from the first external apparatus through the communication unit; and a transfer unit configured to transfer, when the divided files are obtained, the divided files to a second external apparatus through the communication unit, wherein when a first divided file has been generated in the first external apparatus and the first divided file is not a specific divided file, the control unit obtains the divided files, generated from the time-series data, from the specific divided file to the first divided file.

Another aspect of the present disclosure provides a method of controlling a communication apparatus, the communication apparatus comprising a communication unit configured to communicate with an external apparatus, the method comprising: performing control to, when divided files generated sequentially by dividing continuous time-series data have been generated in a first external apparatus, obtain the divided files from the first external apparatus through the communication unit; and when the divided files are obtained, transferring the divided files to a second external apparatus through the communication unit, wherein the control includes, when a first divided file has been generated in the first external apparatus and the first divided file is not a specific divided file, obtaining the divided files, generated from the time-series data, from the specific divided file to the first divided file.

Still another aspect of the present disclosure provides a non-transitory computer-readable storage medium storing instructions to perform a method of controlling a communication apparatus, the communication apparatus comprising a communication unit configured to communicate with an external apparatus, the method comprising: performing control to, when divided files generated sequentially by dividing continuous time-series data have been generated in a first external apparatus, obtain the divided files from the first external apparatus through the communication unit; and when the divided files are obtained, transferring the divided files to a second external apparatus through the communication unit, wherein the control includes, when a first divided file has been generated in the first external apparatus and the first divided file is not a specific divided file, obtaining the divided files, generated from the time-series data, from the specific divided file to the first divided file.

According to the present invention, when transferring time-series data such as moving image files to an external apparatus, situations where files necessary for combining are missing can be prevented.

Further features of the present invention will become apparent from the following description of exemplary embodiments (with reference to the attached drawings).

BRIEF DESCRIPTION OF THE DRAWINGS

FIGS. 4A and 4B are diagrams illustrating chunk recording according to the first embodiment.

FIG. 5AA illustrates an example of a screen in a transfer app controlled by the communication apparatus according to the first embodiment.

FIG. 5AB illustrates an example of a screen in the transfer app controlled by the communication apparatus according to the first embodiment.

FIG. 5B illustrates an example of a screen in the transfer app controlled by the communication apparatus according to the first embodiment.

FIGS. 6A and 6B are sequence charts illustrating an example of operations in transfer processing performed between apparatuses, according to the first embodiment.

FIG. 7 is a flowchart illustrating a series of operations by the communication apparatus when transferring a chunk recording file and a metadata file, according to the first embodiment.

FIGS. 8A and 8B are sequence charts illustrating an example of operations in transfer processing performed between apparatuses, according to a second embodiment.

FIG. 9 is a flowchart illustrating a series of operations by the communication apparatus when transferring a chunk recording file and a metadata file, according to the second embodiment.

DESCRIPTION OF THE EMBODIMENTS

Figure 1:
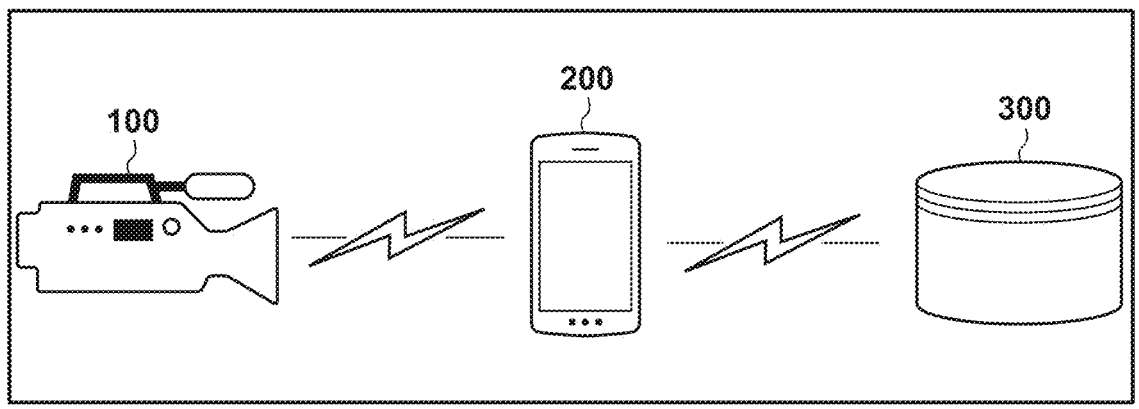
FIG. 1 is a conceptual diagram illustrating the configuration of a system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Overview of Transfer of Chunk Moving Image File

An overview of the transfer of a chunk moving image file according to the present embodiment will be given first. At sites in the mass media industry where images are shot, such as news companies and telecommunication companies, it is necessary to quickly deliver content shot at the site of an interview to the news company or the like, and file transfer solutions which use network communication are currently being provided. Specifically, image/moving image/audio files shot and recorded by an image capturing apparatus are sent to a communication apparatus such as a smartphone and stored within the apparatus. A mobile application is provided which then sends those files from the communication apparatus to an external FTP server over a network. Such a mobile application includes a function for automatically performing the following series of processes (also called a "shooting/automatic transfer function", hereinafter). In the shooting/automatic transfer function, the mobile application receives a notification that the recording of a moving image file is complete from the image capturing apparatus using, for example, Picture Transfer Protocol over Internet Protocol (PTP/IP). The moving image file is then obtained, and the obtained moving image file is transferred to the external FTP server. By activating the shooting/automatic transfer function, a user can automatically deliver captured files to an external destination without performing operations for selecting the files.

However, chunk moving image files generated through chunk recording are typically combined at the destination and handled as a single moving image. Accordingly, at the time of delivery, it is necessary to collect a group including a series of files, from the starting chunk moving image file to the ending chunk moving image file. If the chunk moving image files are delivered with some of the files missing, the files cannot be combined correctly at the destination. When the shooting/automatic transfer function is activated, it becomes possible to receive a notification that the recording of a moving image file is complete from the image capturing apparatus. Thereafter, when the communication apparatus receives a notification that the recording of a moving image file is complete from the image capturing apparatus, the moving image file is obtained from the image capturing apparatus and transferred to the external FTP server. If the processing sequence of the shooting/automatic transfer function is also applied to chunk recording, it is possible, for example, that the chunk recording had already been started on the image capturing apparatus side at the time when the function was activated. In this case, the communication apparatus cannot receive, from the image capturing apparatus, a notification that the recording of a chunk moving image file which was recorded before the function was activated is complete. If, for example, moving image files for which the notification that recording is complete has been received are obtained as-is and transferred to the external apparatus, the files will ultimately be delivered in a state in which the earlier chunk moving image files, which are necessary for the combination at the destination, are missing.

To prevent such situations where chunk moving image files are missing, when a chunk moving image file is generated in the image capturing apparatus, the communication apparatus determines whether that file is a specific chunk moving image file (e.g., the starting file). If that file is not the specific chunk moving image file, the chunk moving image files, generated from the moving image, from (e.g., a starting) chunk moving image file to the generated chunk moving image file, are obtained. The obtained series of chunk moving image files are then transferred to the server. This will be described in detail hereinafter.

Although the following will describe an example in which a moving image file is transferred, the present embodiment is not limited to moving images, and can also be applied when applying chunk recording to time-series data including moving image, audio, and other such data. In this case, the chunk moving image file corresponds to a divided file generated in sequence by dividing continuous time-series data.

Example of System Configuration

An example of the configuration of a system according to a first embodiment will be described with reference to FIG. 1. In FIG. 1, 100 indicates an image capturing apparatus such as a digital video camera. As will be described later, the image capturing apparatus may be a different device, as long as the device is configured to be capable of obtaining time-series data such as moving images. 200 indicates a communication apparatus such as a mobile terminal having a communication function, as represented by a smartphone, for example. 300 indicates a server serving as one example of an image storage apparatus, which can be installed at a connection destination connected over a communication network such as the Internet.

In FIG. 1, the image capturing apparatus 100 and the communication apparatus 200 are connected by a hardwire cable, Wi-Fi, or the like, and are capable of communicating over wires or wirelessly. The image capturing apparatus 100 can, for example, transfer moving image files, metadata files, and the like generated by the image capturing apparatus 100 to the communication apparatus 200. The communication apparatus 200 and the server 300 can communicate using a wireless LAN, mobile communication, or the like. The communication apparatus 200 can, for example, transfer information stored in the communication apparatus 200 to the server 300 using a communication protocol such as FTP. Note, however, that the system configuration is not limited to the foregoing example, and the processing for transferring files among the apparatuses may be realized by the image capturing apparatus 100, the communication apparatus 200, and the server 300 connecting to the same network through access points, rather than using mobile communication.

Configuration of Image Capturing Apparatus 100

Figure 2A:
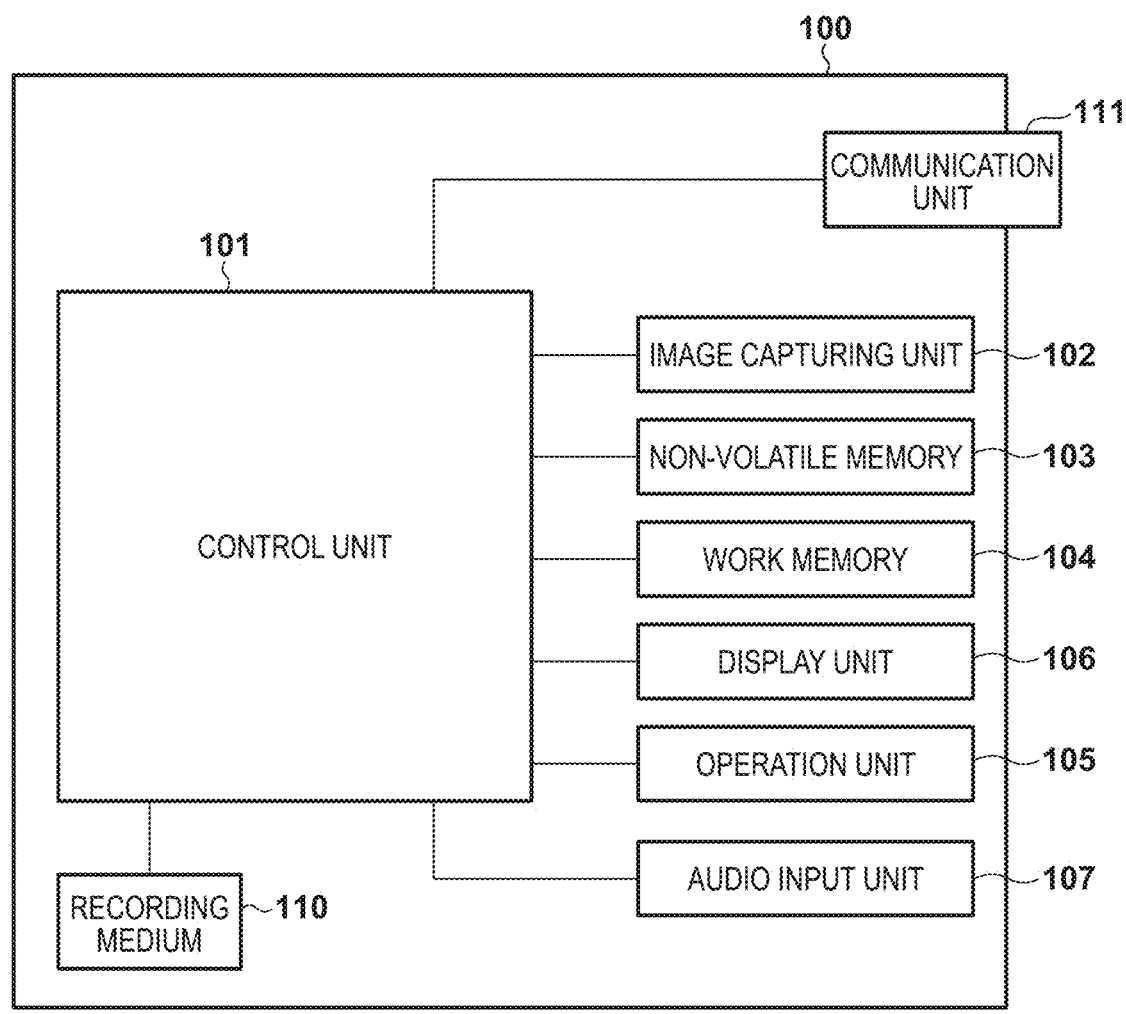
FIGS. 2A and 2B are a block diagram illustrating an example of the configuration of an image capturing apparatus, and a diagram illustrating an example of the appearance of the image capturing apparatus, respectively, according to the first embodiment.

An example of the configuration of the image capturing apparatus 100 according to the present embodiment will be described with reference to FIG. 2A. Although the following will describe a case where a digital video camera is used as the image capturing apparatus as an example, the image capturing apparatus is not limited thereto. The image capturing apparatus may be a portable media player, what is known as a tablet device, a personal computer, or the like.

A control unit 101 includes one or more processors, and controls the various units of the image capturing apparatus 100 (the entire image capturing apparatus) in accordance with input signals, programs (described later), and the like. Note that a plurality of pieces of hardware may control the overall apparatus by sharing processing, rather than the control unit 101 controlling the overall apparatus.

An image capturing unit 102 is constituted by, for example, an optical system that controls an optical lens unit as well as aperture, zoom, and focus, an image sensor for converting light (an image) entering through the optical lens unit into an electrical image signal, and the like. A Complementary Metal Oxide Semiconductor (CMOS), a Charge Coupled Device (CCD), or the like is typically used as the image sensor. Under the control of the control unit 101, the image capturing unit 102 uses the image sensor to convert subject light, formed as an image by a lens included in the image capturing unit 102, into an electrical signal, performs noise reduction processing and the like, and outputs digital data as moving image data. In the image capturing apparatus 100 according to the present embodiment, the moving image data is recorded into a recording medium 110, for example.

A non-volatile memory 103 is a non-volatile memory that can be electrically erased and recorded to, and stores programs (described later) that are executed by the control unit 101, meta template information, and the like.

A work memory 104 is used as a buffer memory that temporarily stores the moving image data captured by the image capturing unit 102, moving image display memory for a display unit 106, a work region for the control unit 101, and the like. The work memory 104 may be a volatile memory.

An operation unit 105 is used for accepting instructions, made by a user in the image capturing apparatus 100, from the user. For example, the operation unit 105 includes a power button through which the user instructs the power of the image capturing apparatus 100 to be turned on and off, a release switch for instructing the start/stop of shooting, a playback button for instructing the playback of moving image data, and the like. The operation unit 105 further includes operation members such as a dedicated "connect" button for starting communication with an external device via a communication unit 111 (described later). The operation unit 105 also includes a touch panel formed on the display unit 106 (described later).

The display unit 106 displays a viewfinder image at the time of shooting, shot moving image data, text for interactive operations, and the like. Note that the display unit 106 does not absolutely need to be built into the image capturing apparatus 100. It is sufficient for the image capturing apparatus 100 to be capable of connecting to an internal or external display unit 106 and have at least a display control function for controlling the display in the display unit 106.

An audio input unit 107 is a device for inputting audio information. Audio data obtained by the audio input unit 107 converting audio information is recorded into the recording medium 110 in an audio file format.

The recording medium 110 can record the moving image data output from the image capturing unit 102 and the audio data output from the audio input unit 107. The recording medium 110 according to the present embodiment includes two slots, for example. When processing moving image data from the image capturing unit 102, the control unit 101 records, into the first slot of the recording medium 110, a high-resolution moving image file designated by the user ("main moving image file", hereinafter), at the resolution of the image sensor (included in the image capturing unit 102; not shown). On the other hand, the control unit 101 records, into the second slot of the recording medium 110, a low-resolution or low-bitrate moving image file ("proxy moving image file", hereinafter), a chunk moving image file obtained by chunk recording, and the like, which are to be sent from the communication unit 111 to the communication apparatus 200 over the network. The recording medium 110 further records metadata file templates. When moving image data is recorded into the recording medium 110, the control unit 101 can generate a new metadata file, in which information such as the recording time of the moving image file has been added to a metadata file template, and record the generated metadata file into the recording medium 110. At this time, it is desirable to use the same filenames for the moving image file and the new metadata file such that those files can be associated with each other. The recording medium 110 may be configured to be removable from the image capturing apparatus 100, or may be built into the image capturing apparatus 100. In other words, it is sufficient for the image capturing apparatus 100 to at least be capable of accessing the recording medium 110.

The communication unit 111 is an interface for connecting to an external apparatus. The image capturing apparatus 100 of the present embodiment can exchange data with the external apparatus through the communication unit 111. For example, the moving image data generated by the control unit 101, the audio data generated by the audio input unit 107, and the like can be sent to the external apparatus through the communication unit 111. In the present embodiment, the communication unit 111 includes an interface for communicating with the external apparatus over what is known as a wireless LAN according to the IEEE 802.11 standard. The communication unit 111 also includes a Universal Serial Bus (USB) interface for connecting to the external apparatus using a USB cable. The control unit 101 implements wireless and wired communication with the external apparatus by controlling the communication unit 111.

Note that the communication unit 111 of the image capturing apparatus 100 according to the present embodiment is capable of operating in an access point mode ("AP mode", hereinafter) so as to operate as an access point in infrastructure mode. The communication unit 111 is furthermore capable of operating in a client mode ("CL mode", hereinafter) so as to operate as a client an infrastructure mode. By operating the communication unit 111 in CL mode, the image capturing apparatus 100 of the present embodiment can operate as a CL device in infrastructure mode. When the image capturing apparatus 100 operates as a CL device, the image capturing apparatus 100 can join a network formed by a nearby AP device by connecting to the AP device. In addition, by operating the communication unit 111 in AP mode, the image capturing apparatus 100 according to the present embodiment can operate as a simplified AP ("simple AP", hereinafter) which is a kind of AP, but has limited functions. When the image capturing apparatus 100 operates as a simple AP, the image capturing apparatus 100 forms a network itself. A device in the vicinity of the image capturing apparatus 100 can recognize the image capturing apparatus 100 as an AP device and join the network formed by the image capturing apparatus 100. A program for causing the image capturing apparatus 100 to function as described above is held in the non-volatile memory 103. Note that the image capturing apparatus 100 may be a simple AP that, while being a kind of AP, does not have a gateway function for transferring data received from a CL device to an Internet provider or the like. In this case, even if the image capturing apparatus 100 receives data from another apparatus that has joined the network formed by the image capturing apparatus 100, that data cannot be transferred to a network such as the Internet.

Figure 2B:
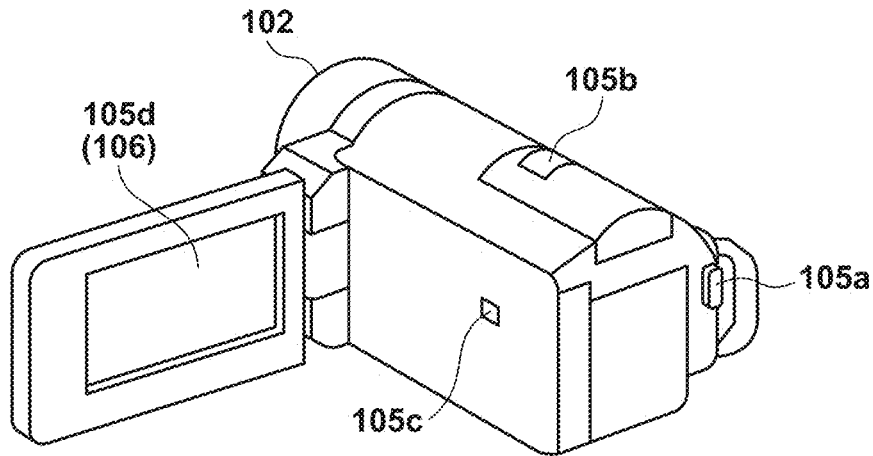

Next, the appearance of the image capturing apparatus 100 will be described with reference to FIG. 2B. A release switch 105a, a zoom lever 105b, a playback button 105c, and a touch panel 105d are operation members included in the operation unit 105 described above. Moving images obtained through the capturing by the image capturing unit 102 are also displayed in the display unit 106.

Example of Configuration of Communication Apparatus 200

Figure 3:
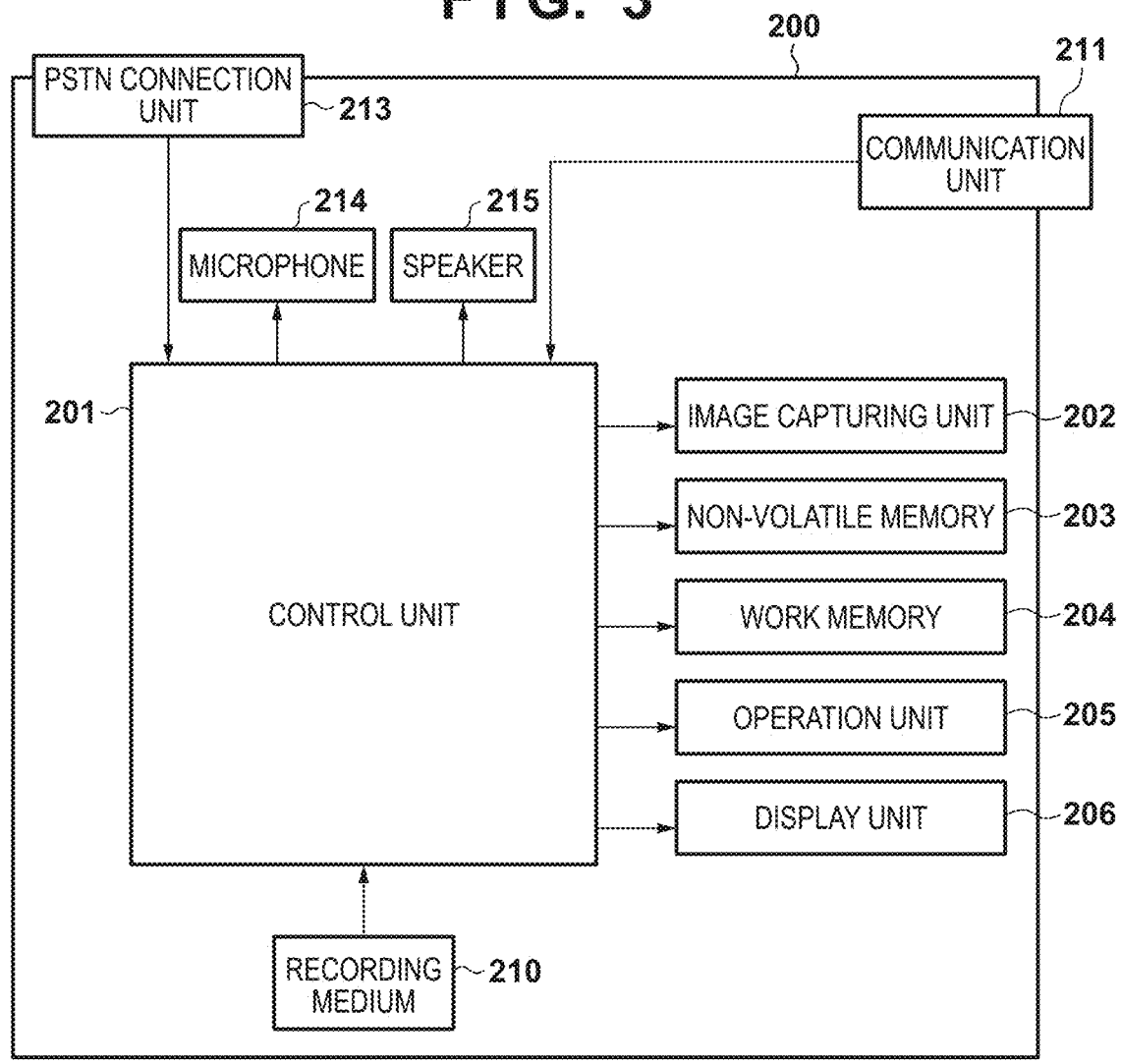
FIG. 3 is a block diagram illustrating an example of the configuration of a communication apparatus according to the first embodiment.

Next, an example of the configuration of the communication apparatus 200 of the present embodiment will be described with reference to FIG. 3. Although a case where a mobile terminal is used as the communication apparatus 200 will be described as an example, the communication apparatus 200 is not limited thereto. The communication apparatus 200 may be a digital video camera having wireless functionality, a tablet device, a personal computer, or the like, for example.

A control unit 201 includes one or more processors, and controls the various units of the communication apparatus 200 (the entire communication apparatus) in accordance with input signals, programs (described later), and the like. Note that a plurality of pieces of hardware may control the overall apparatus by sharing processing rather than the control unit 201 controlling the overall apparatus.

An image capturing unit 202 converts subject light, formed as an image by a lens included in the image capturing unit 202, into an electrical signal, performs noise reduction processing and the like, and outputs digital data as moving image data. The captured moving image data is stored in a buffer memory, subjected to predetermined processing by the control unit 201, and is then recorded into a recording medium 210.

A non-volatile memory 203 is a non-volatile memory that can be electrically erased and recorded to. An operating system (OS), which is basic software executed by the control unit 201, applications that implement practical functions by operating cooperatively with the OS, and the like are recorded in the non-volatile memory 203. In the present embodiment, a transfer application ("transfer app", hereinafter) for the communication apparatus 200 to transfer data with the image capturing apparatus 100 and the server 300 is also stored in the non-volatile memory 203. A file management application ("file management app", hereinafter) and an image management application ("image management app", hereinafter), which manage moving image files and audio files sent from the image capturing apparatus 100, are also stored.

A work memory 204 is used as an image display memory for a display unit 206, a work region for the control unit 201, and the like. In the present embodiment, when transferring moving image files, metadata files, and the like received from the image capturing apparatus 100 to the server 300, those files are stored temporarily. The work memory 204 may be a volatile memory.

An operation unit 205 is used for accepting instructions made to the communication apparatus 200 by a user. The operation unit 205 includes operation members such as, for example, a power button through which the user instructs the power of the communication apparatus 200 to be turned on and off, a touch panel formed on the display unit 206, and the like.

The display unit 206 displays moving image data, a text display for interactive operations, and the like. Note that the communication apparatus 200 does not absolutely need to include the display unit 206. It is sufficient for the communication apparatus 200 to be capable of connecting to the display unit 206 and have at least a display control function for controlling the display in the display unit 206.

The recording medium 210 can record image data output from the image capturing unit 202. The recording medium 210 may be configured to be removable from the communication apparatus 200, or may be built into the communication apparatus 200. In other words, it is sufficient for the communication apparatus 200 to at least be capable of accessing the recording medium 210.

A communication unit 211 is an interface for communicating with an external apparatus. The communication apparatus 200 of the present embodiment can exchange data with the image capturing apparatus 100 and the server 300 through the communication unit 211. In the present embodiment, the communication unit 211 is an antenna, for example, and the control unit 101 can connect to the image capturing apparatus 100 via the antenna. Note that the connections with the image capturing apparatus 100 in the server 300 may be direct connections, or may be connections made via an access point. The PTP/IP protocol over wireless LAN, for example, can be used as the protocol for communicating data.

The communication unit 211 also includes a Universal Serial Bus (USB) interface for connecting to the external apparatus using a USB cable. Note, however, that the communication with the external apparatus is not limited thereto. For example, the communication unit 211 can include an infrared communication module, a Bluetooth (registered trademark) communication module, a wireless communication module such as Wireless USB, or the like.

A PSTN connection unit 213 is an interface used when performing public wireless line communication. The communication apparatus 200 can make voice calls with other devices through the PSTN connection unit 213. At this time, the voice calls are implemented by the control unit 201 inputting and outputting audio signals via a microphone 214 and a speaker 215.

The communication apparatus 200 of the present embodiment can exchange data with the server 300 through the PSTN connection unit 213 as well. The PSTN connection unit 213 is an antenna, for example, and the control unit 201 can connect to a public network via the antenna. Note that the communication unit 211 and the PSTN connection unit 213 can also share a single antenna. Communication performed through the communication unit 211 is typically faster than communication performed over a public network. As such, in the communication apparatus 200 of the present embodiment, communication performed through the communication unit 211 is prioritized when a call is not being made.

Chunk Recording File

Figure 4A:
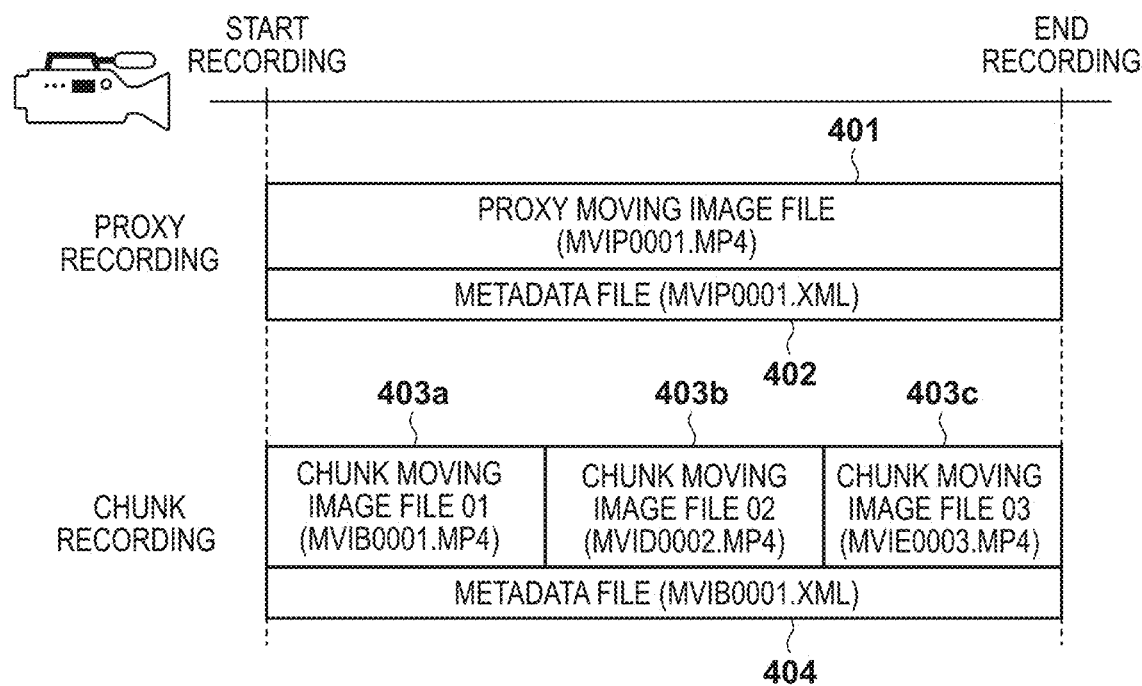

Next, two recording modes used when the image capturing apparatus 100 of the present embodiment records a low-resolution or low-bitrate moving image file in the recording medium 110 in MP4 file format will be described with reference to FIG. 4A. The image capturing apparatus 100 starts recording a moving image in response to the user pressing the release switch 105*a*, and stops the recording in response to the release switch 105*a* being pressed again.

A first mode for recording a moving image file is "proxy recording". In proxy recording, the image capturing apparatus 100 records a proxy moving image file recorded at the same recording time as the main moving image file. 401 indicates a proxy moving image file in which the recording time of the moving image is from the start of recording to the end of recording. In other words, proxy recording is a recording mode in which a single proxy moving image file is generated from the start of recording to the end of recording. At this time, a metadata file 402 is generated at the same time as the generation of the proxy moving image file 401, at the timing of the end of the recording.

In the present embodiment, when generating a filename for the proxy moving image file 401, for example, the image capturing apparatus 100 sets the fourth letter, following "MVI", to "P", and then adds a file number and an extension. As such, the image capturing apparatus 100 sets the filename of the proxy moving image file to, for example, "MVIP0001.MP4". Furthermore, the image capturing apparatus 100 sets a filename for the metadata file 402 to the same name as the proxy moving image file 401, aside from the extension, i.e., "MVIP0001.XML".

A second mode for recording a moving image file is "chunk recording". In chunk recording, the image capturing apparatus 100 records chunk moving image files by dividing a moving image into smaller chunks each time a predetermined amount of time passes during recording. The image capturing apparatus 100 generates a new chunk moving image file when a predetermined amount of time has passed from the start of recording or from the timing at which the previous chunk moving image file was generated. For example, when 30 seconds have passed from the start of recording, the image capturing apparatus 100 generates a chunk moving image file 403*a*, and also generates a metadata file 404. In proxy recording, the recording time of a moving image file is added to the metadata file when the moving image file is generated. However, in chunk recording, the recording time need not be added to the metadata file while a moving image is being recorded. When 30 seconds have passed from when the chunk moving image file 403*a* was generated, the image capturing apparatus 100 generates a chunk moving image file 403*b*. In the example illustrated in FIG. 4A, the image capturing apparatus 100 records chunk moving image files at 30-second intervals up to 403*b*. When the user presses the release switch 105*a* and the recording is stopped, the image capturing apparatus 100 generates a chunk moving image file 403*c* corresponding to the time from when the chunk moving image file 403*b* was generated to when the recording was ended. At this time, the image capturing apparatus 100 updates the metadata file 404 to add the recording time from the start of the recording to the end of the recording, or the like, to the metadata file 404. In this manner, in the chunk recording according to the present embodiment, a chunk moving image file group from the start of recording to the end of recording has a single metadata file.

In the present embodiment, the image capturing apparatus 100 can add filenames to chunk moving images according to a predetermined naming convention, for example. The naming convention for chunk moving image filenames can be as follows, for example. Text indicating that the chunk moving image file 403*a* generated first is a starting moving image file (generated at the start of the recording) is added to that chunk moving image file. For example, the image capturing apparatus 100 sets the fourth letter, following "MVI", to "B". In this case, the filename of the chunk moving image file generated first is "MVIB0001.MP4".

Text indicating that the chunk moving image file 403*b* generated next is an intermediate moving image file is added to that chunk moving image file. For example, the image capturing apparatus 100 sets the fourth letter, following "MVI", to "D". In this case, the filename of the chunk moving image file generated next is "MVID0002.MP4".

Text indicating that the chunk moving image file 403*c* generated last is an ending moving image file (generated at the end of the recording) is added to that chunk moving image file. For example, the image capturing apparatus 100 sets the fourth letter, following "MVI", to "E". In this case, the filename of the chunk moving image file generated last is "MVIE0003.MP4". The filename of the metadata file 404 is the same as that of the chunk moving image file 403*a*, aside from the extension, i.e., "MVIB0001.XML".

Using a naming convention in which specific predetermined text (identification information) is added to the filename (e.g., a naming convention that assigns the fourth letter) in this manner enables a communication apparatus or the like that has obtained the file to identify whether the recording mode is chunk recording or proxy recording. Whether the moving image file in question is the starting moving image file, an intermediate moving image file, or the last moving image file can also be identified from the fourth letter.

Advantages of chunk recording will be described next with reference to FIG. 4B, using, as an example, a case where a moving image file is transferred from the image capturing apparatus 100 to the server 300 via the communication apparatus 200. When performing proxy recording, the image capturing apparatus 100 cannot send a moving image file that is currently being recorded, and therefore starts sending the proxy moving image file after the recording is complete. In this case, in addition to the time required to record the proxy moving image file 401, sending the proxy moving image file 401 takes time as well. 405 in FIG. 4B indicates the time taken from when proxy moving image recording is started to when the transfer of the proxy moving image file 401 is complete.

When performing chunk recording, the image capturing apparatus 100 can successively send generated chunk moving image files even while a moving image is being recorded. For example, once the chunk moving image file 403*a* has been generated (i.e., once the recording to the corresponding file is complete), the chunk moving image file 403*a* can be transferred, even if the image capturing apparatus 100 is still recording. In the example in FIG. 4B, the image capturing apparatus 100 can start transferring the moving image file earlier than the recording time of the proxy moving image file 401 by a differential time 406. When transferring a moving image file generated through chunk recording, the time from when recording is started to when the sending of the moving image file is complete is represented by 407. This therefore provides an advantage in that the transfer time 407 for chunk recording is earlier than the transfer time 405 for proxy recording by a differential time 408.

Example of Transfer Application Screens

Examples of operation screens of a transfer application (also called simply a "transfer app"), which are displayed in the display unit 206 of the communication apparatus 200 of the present embodiment, will be described next with reference to FIGS. 5AA, 5AB, and 5B. FIGS. 5AA, 5AB, and 5B schematically illustrate display states of operation screens of the transfer app. The transfer app causes, for example, a function selection screen 501, a camera content list screen, and a shooting/automatic transfer screen 504 to be displayed in response to user operations.

In FIG. 5AA, 501 indicates the function selection screen, which is a screen displayed while the image capturing apparatus 100 is connected following the transfer app being launched. The function selection screen 501 includes, for example, a camera content list display button 502 and a shooting/automatic transfer button 503. The camera content list display button 502 is a button for obtaining content (e.g., moving image files) recorded in the image capturing apparatus 100 and transitioning to the camera content list screen (described later). The shooting/automatic transfer button 503 is a button for transitioning to the shooting/automatic transfer screen 504 for transferring content received from the image capturing apparatus 100 to another apparatus (e.g., the server 300). When the camera content list display button 502 is pressed, the communication apparatus 200 transitions to a transfer selection screen. Additionally, when the shooting/automatic transfer button 503 is pressed (tapped), the communication apparatus 200 transitions to the shooting/automatic transfer screen 504.

In the shooting/automatic transfer screen 504 illustrated in FIG. 5AB, the communication apparatus 200 displays files transferred from the image capturing apparatus 100 to the server 300 via the communication apparatus 200. In this screen state, the communication apparatus 200 stands by for a moving image file generation notification from the image capturing apparatus 100. 505 indicates a button for returning to the previous screen. 506 indicates an initial screen of the shooting/automatic transfer screen 504, which is displayed when no transfers are underway (when no transferred content is present).

In the shooting/automatic transfer screen illustrated in FIG. 5B, the communication apparatus 200 receives a moving image file generation notification from the image capturing apparatus 100, and displays an indication of the moving image file being transferred to an external apparatus (e.g., the server 300). 507 is a status region indicating the chunk moving image file being transferred and the status of the transfer. Chunk moving image files that have already been transferred and are in the process of being transferred are displayed in a lower part of the status region 507.

508 is a character string indicating the filename of the chunk moving image file. 509 is a component that displays a thumbnail image of the file, and displays a thumbnail image recorded in the moving image file corresponding to the filename 508. 511 is a character string indicating the recording date/time of the file.

510 is an icon indicating that the recording was performed through chunk recording. This icon is displayed based on the recording format, determined by the communication apparatus 200. 512 is a "transfer complete" icon displayed when the processing for receiving and transferring the chunk moving image file is complete. 513 is a "transfer underway" icon displayed when the processing for receiving and transferring the chunk moving image file is underway.

Automatic Transfer Processing Sequence

Figure 6B:
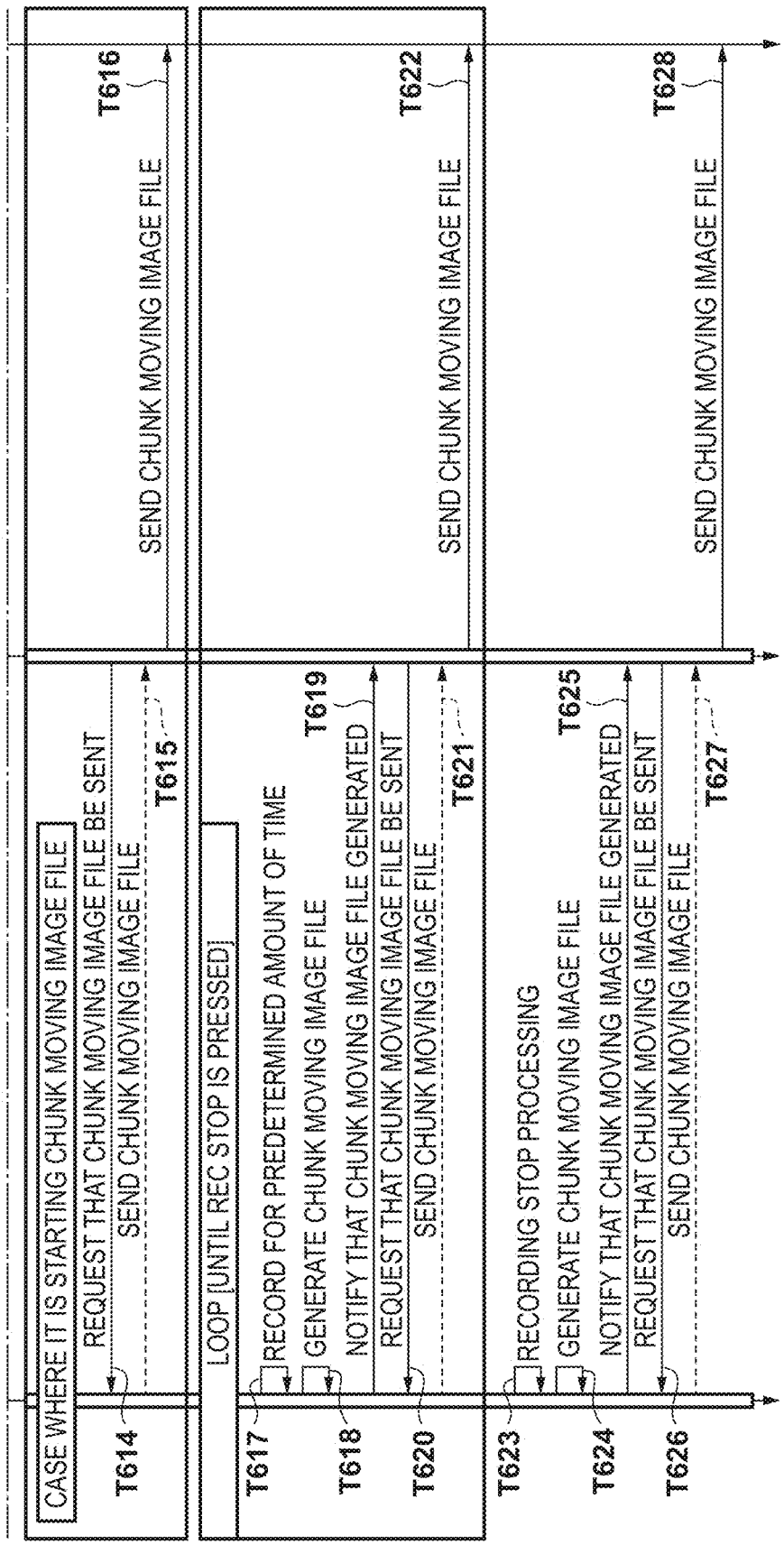

A sequence of processing for transferring a chunk moving image file, recorded by the image capturing apparatus 100, to the server 300 via the communication apparatus 200 (automatic transfer processing) will be described with reference to FIGS. 6A and 6B. Note that the example illustrated in FIGS. 6A and 6B will be described as starting from a state in which the communication apparatus 200 displays the function selection screen 501 illustrated in FIG. 5AA at the start of recording by the image capturing apparatus 100 (i.e., a state in which a moving image file generation notification cannot be received). Note also that unless otherwise specified, in the processing sequence described below, processes described as being performed by the image capturing apparatus 100 are realized by the control unit 101 loading a program stored in the non-volatile memory 103 into the work memory 104 and executing the program to control the various units of the image capturing apparatus 100. Likewise, processes described as being performed by the communication apparatus 200 are realized by the control unit 201 loading a program stored in the non-volatile memory 203 into the work memory 204 and executing the program to control the various units of the communication apparatus 200.

With the transfer app of the communication apparatus 200 displaying the function selection screen 501 illustrated in FIG. 5AA, at T601, the image capturing apparatus 100 accepts the pressing of the release switch 105*a* by the user and starts recording chunk moving image files. Note that the image capturing apparatus 100 can branch the processing according to whether the recording format has been set to proxy recording or chunk recording through the operation unit 105.

If chunk recording is set, at T602, the image capturing apparatus 100 waits for recording for a predetermined amount of time. At T603, the image capturing apparatus 100 generates a chunk moving image file. Here, as described above, the function selection screen 501 illustrated in FIG. 5AA is being displayed, and thus the communication apparatus 200 neither receives a moving image file generation notification, nor requests a chunk moving image file to be sent.

At T604, the communication apparatus 200 transitions to the shooting/automatic transfer screen in response to a user operation. This makes it possible to receive a moving image file generation notification from the image capturing apparatus 100, and request a chunk moving image file to be sent. At T605, the image capturing apparatus 100 waits for recording for a predetermined amount of time. At T606, the image capturing apparatus 100 generates a chunk moving image file. At T607, the image capturing apparatus 100 sends a moving image file generation notification to the communication apparatus 200 via the communication unit 111. By making the moving image file generation notification, the image capturing apparatus 100 makes a notification that a chunk moving image file has been generated. The moving image file generation notification includes identification information such as the filename of the chunk moving image file generated.

At T608, the communication apparatus 200 receives the moving image file generation notification, made at T607, and determines whether the received file is the starting chunk moving image file. The communication apparatus 200 determines whether the received file is the starting chunk moving image file by, for example, referring to the filename included in the moving image file generation notification, and checking whether "MVIB" is included.

If the received file is determined not to be the starting chunk moving image file, the communication apparatus 200 proceeds to T609 to request the starting chunk moving image file to be sent retroactively. On the other hand, if the received file is determined to be the starting chunk moving image file, the communication apparatus 200 proceeds to T614.

At T609, via the communication unit 211, the communication apparatus 200 requests that the image capturing apparatus 100 send an image file list. For example, the filenames of the chunk moving image files generated by the image capturing apparatus 100 are written in the image file list in the order in which those files were generated. The communication apparatus 200 can refer to the filenames written in the image file list in the reverse of the order in which the files were generated (i.e., backwards from the newest file to the oldest file). In other words, by referring to the image file list, the communication apparatus 200 can specify the chunk moving image files generated in the period spanning from the chunk moving image file indicated by the generation notification received in T607 back to the starting chunk moving image file. At T610, the communication apparatus 200 receives the image file list from the image capturing apparatus 100 via the communication unit 211, and repeats the subsequent processing from T611 to T613 based on the image file list. Through this, the communication apparatus 200 obtains, from the image capturing apparatus 100, the series of chunk moving image files generated in the period spanning from the starting chunk moving image file corresponding to the generation notification received at T607 to the chunk moving image file indicated by the generation notification received at T607. The communication apparatus 200 then sends the obtained chunk moving image files to the server 300. With respect to each chunk moving image file, at T611, the communication apparatus 200 requests, via the communication unit 211, the image capturing apparatus 100 to send the chunk moving image file. At T612, the communication apparatus 200 receives the chunk moving image file from the image capturing apparatus 100 via the communication unit 211. At T613, the communication apparatus 200 sends the chunk moving image file received at T612 to the server 300 via the communication unit 211.

In this manner, the communication apparatus 200 can obtain chunk moving image files which could not be received from the image capturing apparatus 100 (i.e., the chunk moving image files from the start of the moving image to the most recent chunk moving image file), and can transfer those files to the server 300. The server 300 can therefore obtain the files required to combine into the moving image without any files being missing.

The processing from T614 to T616 is processing performed when the communication apparatus 200 determines that the chunk moving image file is the starting chunk moving image file based on the generation notification received in T607. In this case, the communication apparatus 200 obtains only the starting chunk moving image file, and transfers that file to the server 300. This processing is equivalent to the processing from T611 to T613, and will therefore not be described.

Next, at T617, the image capturing apparatus 100 continues recording until a predetermined amount of time has passed following the generation of the chunk moving image file at T605. In the processing from T618 to T622, the communication apparatus 200 obtains chunk moving image files generated by the image capturing apparatus 100 every predetermined amount of time, and transfers the files to the server 300. Note that the processing of T618 and T619 (the chunk moving image file generation and the moving image file generation notification) is equivalent to the processing described above with reference to T606 and T607. Likewise, the processing from T620 to T622 (the processing from the request to send the chunk moving image file to the sending of the chunk moving image file) is equivalent to the processing described above with reference to T611 to T613. Note that the image capturing apparatus 100 loops (repeatedly executes) the processing from T617 to T622 until the user presses the release switch 105a. Upon accepting the pressing of the release switch 105a by the user, the image capturing apparatus 100 exits the loop processing, and performs recording stop processing at T623.

At T624, the image capturing apparatus 100 generates a final chunk moving image file. The subsequent processing from T625 to T628 (the processing from the moving image file generation notification to the sending of the chunk moving image file) is equivalent to the processing described above with reference to T619 to T622.

Automatic Transfer Processing Operations in Communication Apparatus

Automatic transfer processing operations performed in the communication apparatus 200, for transferring a moving image file recorded by the image capturing apparatus 100 to the server 300, will be described next with reference to FIG. 7. Note that unless specifically mentioned otherwise, the automatic transfer processing according to the present embodiment is realized by the control unit 201 loading a program stored in the non-volatile memory 203 into the work memory 204 and executing the program to control the various units of the communication apparatus 200. The operations illustrated in FIG. 7 are started when the transfer app of the communication apparatus 200 transitions to the shooting/automatic transfer screen 504 illustrated in FIG. 5AB, in a state where the image capturing apparatus 100 has started recording chunk moving images.

In step S701, the control unit 201 determines whether a moving image file generation notification has been received from the image capturing apparatus 100 via the communication unit 211. If the generation notification is determined to have been received, the control unit 201 moves the sequence to step S702, whereas if not, the control unit 201 stands by to receive the generation notification.

In step S702, the control unit 201 determines whether the file indicated in the moving image file generation notification received in step S701 is the starting chunk moving image file. The control unit 201 makes this determination by referring to the filename information included in the generation notification and determining whether "MVIB" is included. If the chunk moving image file indicated by the generation notification is determined to be the starting chunk moving image file, the control unit 201 moves the sequence to step S705. In this case, the chunk moving image file generated by the image capturing apparatus 100 is the starting chunk moving image file, and the communication apparatus 200 may therefore obtain that chunk moving image file.

On the other hand, if the chunk moving image file indicated by the generation notification is determined not to be the starting chunk moving image file, the control unit 201 moves the sequence to step S703. In this case, several chunk moving image files following the starting file, which have already been generated by the image capturing apparatus 100 but have not yet been obtained by the communication apparatus 200, are present. It is therefore necessary for the communication apparatus 200 to specify these chunk moving image files and obtain those files from the image capturing apparatus 100.

In step S703, the control unit 201 sends an image file list request to the image capturing apparatus 100 via the communication unit 211, and obtains the image file list. In step S704, the control unit 201 requests the starting chunk moving image file corresponding to the chunk moving image file indicated by the generation notification received in step S701, and the chunk moving image files generated before the chunk moving image file indicated by the generation notification was generated. At this time, by referring to the image file list, the communication apparatus 200 can specify the chunk moving image files generated in the period spanning from the chunk moving image file indicated by the generation notification received in step S702 back to the starting chunk moving image file. For example, the control unit 201 requests that the image capturing apparatus 100 send each chunk moving image file. When the chunk moving image files are obtained from the image capturing apparatus 100, the control unit 201 transfers those moving image files to the server 300 and then ends the sequence.

In step S705, the control unit 201 sends, to the image capturing apparatus 100 via the communication unit 211, a request to send the chunk moving image file indicated by the moving image file generation notification received in step S701. When the chunk moving image file is obtained from the image capturing apparatus 100, the control unit 201 transfers that moving image file to the server 300 and then ends the sequence.

In this manner, when the starting chunk moving image file is generated in the image capturing apparatus 100 while the function selection screen 501 illustrated in FIG. 5AA is displayed (while the generation notification cannot be received), the communication apparatus 200 cannot request that the image capturing apparatus 100 send that file. However, thereafter, the communication apparatus 200 transitions to the shooting/automatic transfer screen, and the chunk moving image files which could not be obtained are obtained from the start, based on the image file list, when a subsequent moving image file generation notification is received. In other words, the communication apparatus 200 can obtain the chunk moving image files generated in the period spanning from the starting chunk moving image file in the moving image to the chunk moving image file for which the notification was made, and can send those files to the server 300.

The present embodiment has described, as an example, a case where the filenames are referred to in order to determine the starting chunk moving image file. However, the determination of the starting chunk moving image file is not limited thereto. In other words, data indicating that the chunk moving image file is the starting chunk moving image file, written in a specific region of the metadata of the chunk moving image file, may be used for the stated determination.

Second Embodiment

In the first embodiment, when the moving image file generation notification is received after chunk moving image recording has been started, the communication apparatus 200 obtains the chunk moving image files going back to the starting chunk moving image file, based on the image file list. A second embodiment will describe an example of processing performed when, after sending one or more chunk moving image files to the server 300, the communication apparatus 200 becomes unable to receive a subsequent moving image file generation notification. Specifically, with the communication apparatus 200 having transitioned to the shooting/automatic transfer screen, i.e., in a state where an image generation notification can be received, the image capturing apparatus 100 starts recording chunk moving images, and one or more chunk moving image files are transferred to the server 300. Even if the communication apparatus 200 then transitions to the function selection screen and can no longer receive the moving image file generation notifications from partway through, the series of chunk moving image files can still be sent to the server 300.

Although the second embodiment differs from the first embodiment in terms of some of the automatic transfer processing operations in the communication apparatus 200, the configurations of the image capturing apparatus 100 and the communication apparatus 200 are the same as in the first embodiment. As such, configurations that are identical or substantially identical will be given the same reference signs, and redundant descriptions will be omitted.

Automatic Transfer Processing Sequence

Figure 8B:
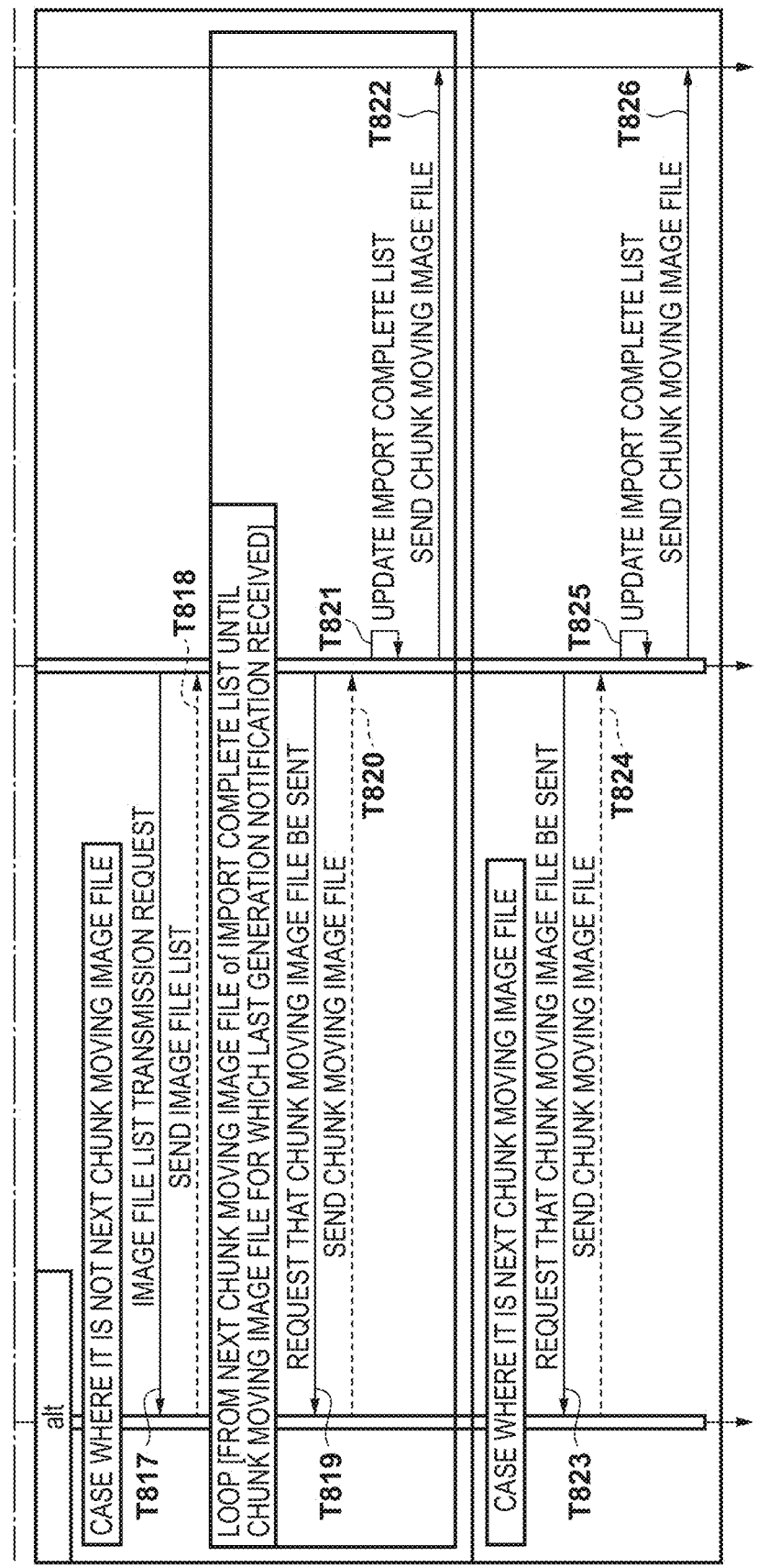

The processing for transferring a chunk moving image file, recorded by the image capturing apparatus 100, to the server 300 via the communication apparatus 200 will be described with reference to FIGS. 8A and 8B. This sequence will be described as starting when the communication apparatus 200 transitions to the shooting/automatic transfer screen illustrated in FIG. 5AB at the start of recording in the image capturing apparatus 100.

At T801, upon accepting the pressing of the release switch 105a by the user, the image capturing apparatus 100 starts recording chunk moving image files.

The processing from T802 to T806 is the same as the sequence performed when the communication apparatus 200 can receive a moving image file generation notification. In other words, the processes of T605, T606, T607, T611, and T612 according to the first embodiment are executed in that order.

At T807, the communication apparatus 200 updates an import complete list stored in the work memory 204. The import complete list is a list to which the communication apparatus 200 adds the filename of a chunk moving image file upon the chunk moving image file being sent from the image capturing apparatus 100 to the communication apparatus 200. Note that the import complete list may include information capable of uniquely identifying the chunk moving image file, and is not limited to the filename of the chunk moving image file. For example, the information that uniquely specifies the chunk moving image file may be an image ID or the like added when an image is generated by the image capturing apparatus 100. The communication apparatus 200 can, for example, generate a new import complete list if no import complete list is present when a chunk moving image file is received, and can delete the import complete list upon disconnecting from the image capturing apparatus 100, but the configuration is not limited thereto. At T808, the communication apparatus 200 sends the obtained chunk moving image files to the server 300, in the same manner as at T613 in the first embodiment.

At T809, upon accepting an operation from the user, the communication apparatus 200 transitions from the shooting/automatic transfer screen to the function selection screen. The image capturing apparatus 100 generates a chunk moving image file by performing the processing of T810 and T811 in the same manner as T605 and T606 according to the first embodiment. At T810 and T811, the function selection screen 501 illustrated in FIG. 5AA is being displayed, and thus the communication apparatus 200 neither receives a moving image file generation notification, nor requests a chunk moving image file to be sent.

Thereafter, at T812, upon accepting an operation from the user, the communication apparatus 200 transitions from the function selection screen to the shooting/automatic transfer screen.

The image capturing apparatus 100 performs the processing from T813 to T815 in the same manner as that performed from T802 to T804. In other words, the image capturing apparatus 100 generates a new chunk moving image file, and sends a generation notification for the generated moving image file to the communication apparatus 200.

At T816, the communication apparatus 200 refers to the import complete list, and determines whether the chunk moving image file indicated by the generation notification received at T815 is the next chunk moving image file written in the import complete list. The communication apparatus 200 determines whether the file is the next file by, for example, determining whether a number thereof is next in a series in the naming convention of the files. The communication apparatus 200 proceeds to T823 if the chunk moving image file indicated by the generation notification received at T815 is determined to be the next chunk moving image file written in the import complete list, and proceeds to T817 if not.

T817 and T818 are the same as T609 and T610 in the first embodiment. In other words, the communication apparatus 200 requests that the image file list be sent, and the image capturing apparatus 100 sends the image file list to the communication apparatus 200.

At T819 to T822, using the image file list received at T818, the communication apparatus 200 obtains and transfers the series of chunk moving image files, from the chunk moving image file next in the import complete list to the chunk moving image file for which the notification was made at T815. Although the processes of T819 and T822 are repeated the same number of times as there are chunk moving image files obtained, the processes performed at T819 to T822 are equivalent to those of T805 to T808 described above.

The processing from T823 to T826 is processing performed when the communication apparatus 200 has determined that the chunk moving image file indicated by the generation notification received at T815 is the next chunk moving image file written in the import complete list. Through the processing from T823 to T826, the communication apparatus 200 obtains only the next chunk moving image file, and transfers that file to the server 300. The processes performed at T823 to T826 are equivalent to those of T819 to T822 described above.

Automatic Transfer Processing Operations in Communication Apparatus

Automatic transfer processing operations performed by the communication apparatus 200 will be described next with reference to FIG. 9. Note that unless specifically mentioned otherwise, the automatic transfer processing according to the present embodiment is realized by the control unit 201 loading a program stored in the non-volatile memory 203 into the work memory 204 and executing the program to control the various units of the communication apparatus 200. The processing illustrated in FIG. 9 is started when the transfer app of the communication apparatus 200 transitions from the state in FIG. 5AA to that in FIG. 5AB, in a state where the image capturing apparatus 100 has started recording chunk moving images.

In step S901, the control unit 201 determines whether a moving image file generation notification has been received from the image capturing apparatus 100 via the communication unit 211. The control unit 201 moves the sequence to step S902 if it is determined that a moving image file generation notification has been received, and stands by for the generation notification if not.

In step S902, the control unit 201 determines whether the chunk moving image file indicated by the moving image file generation notification received in step S901 is the next chunk moving image file written in the import complete list after the stated chunk moving image file. As described above, the control unit 201 determines whether the file is the next file by determining whether the number thereof is next in a series in the naming convention for the filenames. The control unit 201 moves the sequence to step S905 if the chunk moving image file indicated by the received moving image file generation notification is determined to be the next chunk moving image file written in the import complete list, and moves the sequence to step S903 if not.

In step S903, the control unit 201 sends an image file list request to the image capturing apparatus 100 via the communication unit 211, and obtains the image file list. In step S904, the control unit 201 specifies a chunk moving image file by referring to the received image file list and the filename at the end of the import complete list held in the work memory 204, and requests that the image capturing apparatus 100 sends chunk moving image files via the communication unit 211. Specifically, the control unit 201 specifies, in the image file list, the chunk moving image files, from the next chunk moving image file after the end to the chunk moving image file indicated by the generation notification made at S901, and requests that the image capturing apparatus 100 send those files.

In step S905, the control unit 201 requests the chunk moving image file indicated by the generation notification received in step S901 from the image capturing apparatus 100 via the communication unit 211.

As described above, according to the present embodiment, a series of chunk moving image files that have not been obtained can be obtained by holding an import complete list and verifying that list against an image file list obtained from the image capturing apparatus 100. By doing so, even if the communication apparatus 200 transitions to displaying the function selection screen during the shooting/automatic transfer of a series of chunk moving image files, and the chunk moving image files can no longer be obtained partway through, the series of chunk moving image files can be sent at a later time. In other words, when transferring time-series data such as moving image files to an external apparatus, situations where files necessary for combining are missing can be prevented.

Although the present embodiment describes a case where the import complete list is used as an example, the configuration is not limited thereto. For example, the communication apparatus 200 may receive a moving image file generation notification from the image capturing apparatus 100 while the function selection screen is displayed (i.e., in a state where chunk moving image files cannot be received), and may generate/update an unsent file list upon receiving the generation notification. Here, the unsent file list includes, for example, information of the chunk moving image file indicated by the moving image file generation notification. Through this, if, when the communication apparatus 200 transitions to the shooting/automatic transfer screen and is therefore capable of receiving chunk moving image files, a moving image file generation notification is received from the image capturing apparatus 100, the communication apparatus 200 can determine whether that file is the next chunk moving image file in the unsent file list. If the file is the next file in the unsent file list, the series of chunk moving image files can be obtained by requesting the corresponding chunk moving image files in the unsent file list to be sent. In this manner as well, when transferring moving image files to the server 300, situations where files necessary for combining are missing can be prevented.

Although preferred embodiments of the present invention have been described above, the present invention is not intended to be limited to these embodiments, and many variations and alterations are possible within the scope thereof. For example, various types of related files generated in connection with a moving image file may be handled in the same manner as the moving image file.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-192353, filed Nov. 10, 2023 which is hereby incorporated by reference herein in its entirety.

What is claimed is:

1. A communication apparatus comprising:
a communication unit configured to communicate with an external apparatus;
a control unit configured to perform, when divided files generated sequentially by dividing continuous time-series data have been generated in a first external apparatus, control to obtain the divided files from the first external apparatus through the communication unit; and
a transfer unit configured to transfer, when the divided files are obtained, the divided files to a second external apparatus through the communication unit,
wherein when a first divided file has been generated in the first external apparatus and the first divided file is not a specific divided file, the control unit obtains the divided files, generated from the time-series data, from the specific divided file to the first divided file.

2. The communication apparatus of claim 1,
wherein the specific divided file is a starting divided file in the time-series data, and
when the first divided file has been generated and the first divided file is not the starting divided file, the control unit obtains the divided files, generated from the time-series data, from the starting divided file to the first divided file.

3. The communication apparatus of claim 1, further comprising:
a storage unit configured to store information indicating the divided files obtained from the first external apparatus,
wherein the specific divided file is a second divided file generated after the divided files indicated by the information, and
when the first divided file has been generated and the first divided file is not the second divided file, the control unit obtains the divided files, generated from the time-series data, from the second divided file to the first divided file.

4. The communication apparatus of claim 1,
wherein when the first divided file generated is the specific divided file, the control unit obtains only the first divided file.

5. The communication apparatus of claim 1, further comprising:
a first obtaining unit configured to obtain, from the first external apparatus, a file list indicating the divided files generated,
wherein the control unit specifies the divided files, generated from the time-series data, from the specific divided file to the first divided file, using the file list.

6. The communication apparatus of claim 1, further comprising:
a second obtaining unit configured to obtain, from the first external apparatus, a generation notification indicating that a divided file has been generated in the first external apparatus,
wherein the control unit determines whether the first divided file generated is the specific divided file based on information on the divided file included in the generation notification.

7. The communication apparatus of claim 1, further comprising:
a second obtaining unit configured to obtain, from the first external apparatus, a generation notification indicating that a divided file has been generated in the first external apparatus,
wherein when the divided file indicated by the generation notification cannot be obtained from the first external apparatus, the control unit adds information on the divided file indicated by the generation notification to an unsent file list, and
when the first divided file has been generated, the control unit obtains the divided files from the divided file indicated by the unsent file list to the first divided file.

8. The communication apparatus of claim 1, further comprising:

a determining unit configured to determine whether the first divided file generated is the specific divided file, wherein the determining unit uses identification information of a divided file indicated by a generation notification from the first external apparatus, the generation notification indicating that the divided file has been generated in the first external apparatus.

9. The communication apparatus of claim 8, wherein the identification information of the divided file indicated by the generation notification includes at least one of information indicating that the divided file is a starting divided file in the time-series data and a number indicating an order.

10. A method of controlling a communication apparatus, the communication apparatus comprising a communication unit configured to communicate with an external apparatus, the method comprising:

performing control to, when divided files generated sequentially by dividing continuous time-series data have been generated in a first external apparatus, obtain the divided files from the first external apparatus through the communication unit; and when the divided files are obtained, transferring the divided files to a second external apparatus through the communication unit, wherein the control includes, when a first divided file has been generated in the first external apparatus and the first divided file is not a specific divided file, obtaining the divided files, generated from the time-series data, from the specific divided file to the first divided file.

11. A non-transitory computer-readable storage medium storing instructions to perform a method of controlling a communication apparatus, the communication apparatus comprising a communication unit configured to communicate with an external apparatus, the method comprising:

performing control to, when divided files generated sequentially by dividing continuous time-series data have been generated in a first external apparatus, obtain the divided files from the first external apparatus through the communication unit; and when the divided files are obtained, transferring the divided files to a second external apparatus through the communication unit, wherein the control includes, when a first divided file has been generated in the first external apparatus and the first divided file is not a specific divided file, obtaining the divided files, generated from the time-series data, from the specific divided file to the first divided file.

* * * * *